United States Patent
Bhatnagar et al.

(10) Patent No.: US 7,600,537 B2
(45) Date of Patent: Oct. 13, 2009

(54) REINFORCED PLASTIC PIPE

(75) Inventors: Ashok Bhatnagar, Richmond, VA (US); Lori L. Wagner, Richmond, VA (US); Brian D. Arvidson, Chester, VA (US); Timothy Swinger, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 827 days.

(21) Appl. No.: 11/228,935

(22) Filed: Sep. 16, 2005

(65) Prior Publication Data

US 2007/0062595 A1 Mar. 22, 2007

(51) Int. Cl.
*F16L 11/00* (2006.01)

(52) U.S. Cl. .................. 138/137; 138/123; 138/125; 138/141; 138/144

(58) Field of Classification Search .............. 138/123, 138/125, 129, 130, 144, 141, 127
See application file for complete search history.

(56) References Cited

U.S. PATENT DOCUMENTS

| | | | |
|---|---|---|---|
| 3,739,567 A | 6/1973 | Williamson | 428/95 |
| 4,009,063 A | 2/1977 | Wood | 156/71 |
| 4,064,211 A | 12/1977 | Wood | 264/95 |
| 4,135,958 A | 1/1979 | Wood | 156/199 |
| 4,137,394 A | 1/1979 | Meihuizen et al. | 528/100 |
| 4,356,138 A | 10/1982 | Kavesh et al. | 264/164 |
| 4,403,012 A | 9/1983 | Harpell et al. | 428/290 |
| 4,413,110 A | 11/1983 | Kavesh et al. | 526/348.1 |
| 4,457,985 A | 7/1984 | Harpell et al. | 428/224 |
| 4,543,286 A | 9/1985 | Harpell et al. | 428/296.4 |
| 4,547,142 A | 10/1985 | Arenhovel et al. | 425/378.1 |
| 4,563,392 A * | 1/1986 | Harpell et al. | 428/394 |
| 4,623,574 A | 11/1986 | Harpell et al. | 428/113 |
| 4,737,402 A | 4/1988 | Harpell et al. | 442/187 |
| 4,748,064 A | 5/1988 | Harpell et al. | 428/113 |
| 4,818,314 A | 4/1989 | Britain et al. | 156/87 |
| 4,916,000 A | 4/1990 | Li et al. | 428/105 |
| 5,375,626 A | 12/1994 | Fears | 138/103 |
| 5,395,472 A | 3/1995 | Mandich | 156/287 |
| 5,551,484 A | 9/1996 | Charbonneau | 138/104 |
| 5,632,952 A | 5/1997 | Mandich | 264/516 |
| 5,683,767 A | 11/1997 | Shiraki et al. | 428/34.9 |
| 5,702,657 A | 12/1997 | Yoshida et al. | 264/112 |
| 5,765,600 A | 6/1998 | Newaz | 138/141 |
| 5,810,053 A | 9/1998 | Mandich | 138/98 |
| 5,965,223 A | 10/1999 | Andrews et al. | 428/34.5 |
| 6,280,546 B1 | 8/2001 | Holland et al. | 156/85 |
| 6,642,159 B1 | 11/2003 | Bhatnagar et al. | 442/134 |
| 6,708,729 B1 | 3/2004 | Smith | 138/98 |
| 6,720,277 B1 * | 4/2004 | Howland | 442/208 |
| 6,818,091 B1 | 11/2004 | Holland et al. | 156/309.6 |
| 6,889,716 B2 | 5/2005 | Lundberg et al. | 138/130 |
| 7,223,470 B2 * | 5/2007 | Twomey et al. | 428/364 |
| 2001/0051481 A1 | 12/2001 | Carroll | 442/71 |
| 2003/0024629 A1 | 2/2003 | Wright et al. | 156/156 |
| 2004/0261876 A1 | 12/2004 | Warren et al. | 138/125 |
| 2005/0176320 A1 | 8/2005 | Holland et al. | 442/59 |
| 2008/0107900 A1 * | 5/2008 | Twomey et al. | 428/375 |

FOREIGN PATENT DOCUMENTS

| | | |
|---|---|---|
| WO | WO9208922 | 5/1992 |
| WO | WO9616790 | 6/1996 |

\* cited by examiner

*Primary Examiner*—Patrick F Brinson
(74) *Attorney, Agent, or Firm*—Erika S. Wilson

(57) ABSTRACT

Plastic pipes, such as high density polyethylene plastic pipes, useful for distributing natural gas and which have improved impact resistance and burst strength. The plastic pipe has an inner and an outer surface, with the inner surface defining a channel for conveying natural gas and the like. A fabric overlies the outer surface, preferably in a helical wrap. The fabric is formed of high tenacity polyolefin fibers, preferably polyethylene and/or polypropylene fibers. The fabric provides the pipe with improved burst strength and impact resistance. The pipe can be used to transport natural gas under low pressure or higher pressures.

36 Claims, No Drawings

US 7,600,537 B2

REINFORCED PLASTIC PIPE

BACKGROUND OF THE INVENTION

1. Field of the Invention

This invention relates to reinforced plastic pipes, and in particular to reinforced plastic pipes for conveying natural gas.

2. Description of the Related Art

Conventional low pressure natural gas pipes are typically formed from a plastic material, such as high density polyethylene (HDPE). These structures are used to transport natural gas at a low pressure, and are also used to transport other materials. The maximum burst strength of such pipes is typically about 200 psi (1378 kPA).

HDPE natural gas pipes are typically buried underground. In such an environment, they are subject to possible breakage due to scratches or the like from rocks, heavy machinery, etc.

It would be desirable to provide a plastic pipe structure that was resistant to breakage and which also had improved burst strength over conventional plastic piping. By increasing the burst strength, it would be possible to safely transport natural gas under increased pressures, thereby reducing the transportation costs. It would also be desirable to provide such a reinforced pipe at minimal additional cost.

SUMMARY OF THE INVENTION

In accordance with this invention, there is provided a pipe for distribution of natural gas comprising:

(a) a plastic pipe, the pipe having an inner surface and an outer surface, the inner surface defining a channel for conveying natural gas therethrough, and (b) a fabric overlying at least a portion of the outer surface of the pipe and forming a sleeve around at least a portion of the pipe, the fabric comprising high tenacity polyolefin fibers, whereby the pipe is resistant to impact and has improved burst strength.

Also in accordance with this invention, there is provided a pipe for distribution of natural gas comprising:

(a) a plastic pipe, the pipe having an inner surface and an outer surface, the inner surface defining a channel for conveying natural gas therethrough, and (b) a non-woven fabric overlying at least a portion of the outer surface of the pipe in a helical manner and forming a sleeve around at least a portion of the pipe, the sleeve being movable over the pipe, the fabric comprising high tenacity polyolefin fibers, whereby the pipe is resistant to impact and has improved burst strength.

Further in accordance with this invention, there is provided a pipe for distribution of natural gas comprising:

(a) a plastic pipe, the pipe having an inner surface and an outer surface, the inner surface defining a channel for conveying natural gas therethrough, and (b) a woven fabric overlying at least a portion of the outer surface of the pipe in a helical manner and forming a sleeve around at least a portion of the pipe, the woven fabric comprising high tenacity polyolefin fibers, whereby the pipe is resistant to impact and has improved burst strength.

In further accordance with this invention, there is provided a method of transporting natural gas through a pipe, the method comprising utilizing as the pipe a structure which comprises:

(a) a plastic pipe formed from high density polyethylene, the pipe having an inner surface and an outer surface, the inner surface defining a channel for conveying natural gas therethrough, and (b) a fabric overlying at least a portion of the outer surface of the pipe and forming a sleeve around at least a portion of the pipe, the fabric comprising high tenacity polyolefin fibers.

The invention thus provides an improved natural gas distribution pipe which has improved abrasion resistance and also has improved burst strength. The use of high tenacity polyolefin fibers in the fabric which overlies the outer surface of the plastic pipe provides the improved protection and burst strength without significantly adding to the weight of the pipe or the cost of manufacture. The pipe thus has excellent reinforcement properties at a relatively low cost. The pipe can be used to distribute natural gas under low pressure or under higher pressures.

DETAILED DESCRIPTION OF THE INVENTION

The plastic pipe which forms the basis of the construction of this invention is formed from a thermoplastic material. Most preferably, the plastic pipe is formed from high density polyethylene (HDPE) resin, in a known fashion. The HDPE resin may be a homopolymer or a copolymer with minor amounts of comonomers such as propylene, butene, hexene, etc. The pipe is preferably formed in a known manner, such as by extrusion from a cylindrical die under appropriate heat and pressure. The plastic pipe preferably has a circular cross-section, although other cross-sections may be utilized, and is semi-flexible. The outer surface of the plastic pipe is preferably smooth, although it may alternatively have a plurality of ribs to enhance its flexibility. As formed, the pipe has an inner surface which defines an internal channel of the pipe for conveying product therethrough. The plastic pipe is adapted to convey natural gas through the channel. The pipe may be of any suitable internal diameter and thickness; typical diameters include 4 inches (10.2 cm), 12 inches (30.5 cm) and 24 inches (61.0 cm).

The present invention includes a fabric sleeve which overlies the outer surface of the pipe. The fabric is formed from high tenacity polyolefin fibers, preferably high tenacity polyethylene fibers and/or high tenacity polypropylene fibers. For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

The fibers may be of any suitable denier, such as, for example, about 50 to about 3000 denier, more preferably from about 200 to about 5000 denier, still more preferably from about 650 to about 3000 denier, and most preferably from about 800 to about 1500 denier.

The fabric of this invention may be in the form of woven, knitted or non-woven fabrics formed from the high tenacity polyolefin fibers, most preferably high tenacity extended chain polyethylene fibers. Preferably, at least about 50% by weight of the fibers in the fabric are such high tenacity fibers, more preferably at least about 75% by weight of the fibers in the fabric are such high tenacity fibers, and most preferably substantially all of the fibers in the fabric are high tenacity fibers, especially when the fabric is a non-woven fabric. When the fabric is a woven or knitted fabric, preferably at least about 70%, more preferably at least about 90%, by weight of the fibers are the high tenacity polyolefin fibers. The remaining fibers in the fabric construction may be any suitable thermoplastic fibers, such as polyester or nylon fibers. Alternatively, non-thermoplastic fibers may be used in the fabric together with the high tenacity polyolefin fibers. Examples of such other fibers include metal fibers, ceramic fibers, glass fibers, graphite fibers and the like.

The yarns may be in essentially parallel alignment (unidirectionally aligned), or the yarns may be twisted, overwrapped or entangled. The fabrics of the invention may be woven with yarns having different fibers in the warp and weft directions, or in other directions.

Most preferably, when the fabric is a non-woven fabric substantially all of the fibers of the fabric are high tenacity polyolefin fibers. When the fabric is a woven fabric, preferably the fibers in the warp direction are high tenacity polyolefin fibers, most preferably high tenacity extended chain polyethylene fibers and the fibers in the weft direction are polyester fibers, more preferably polyethylene terephthalate fibers.

The high strength fibers useful in the fabrics used in this invention are high tenacity polyolefin fibers, including high tenacity polyethylene fibers and/or high tenacity polypropylene fibers. The high tenacity polyethylene fibers are extended chain polyethylene fibers, which are also referred to as highly oriented high molecular weight polyethylene fibers.

U.S. Pat. No. 4,457,985 generally discusses such high molecular weight polyethylene fibers and polypropylene fibers, and the disclosure of this patent is hereby incorporated by reference to the extent that it is not inconsistent herewith. In the case of polyethylene fibers, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004, 699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers are commercially available and are sold under the trademark SPECTRA® by Honeywell International Inc. of Morristown, N.J., U.S.A.

Depending upon the formation technique, the draw ratio and temperatures, and other conditions, a variety of properties can be imparted to these fibers. The tenacity of the polyethylene fibers is at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

As mentioned above, the high strength fibers may be in the form of a woven, knitted or non-woven fabric. One preferred material is a woven fabric formed from SPECTRA® extended chain polyethylene fibers. In one embodiment, the fabric preferably has between about 15 and about 55 ends per inch (about 5.9 to about 21.6 ends per cm) in both the warp and fill directions, and more preferably between about 17 and about 45 ends per inch (about 6.7 to about 17.7 ends per cm). The yarns are preferably each between about 200 and about 1200 denier. The result is a woven fabric weighing preferably between about 2 and about 15 ounces per square yard (about 67.8 to about 508.6 $g/m^2$), and more preferably between about 5 and about 11 ounces per square yard (about 169.5 to about 373.0 $g/m^2$). Examples of such fabrics are those designated as SPECTRA® fabric styles 902, 904, 952, 955 and 960. As those skilled in the art will appreciate, the fabric constructions described here are exemplary only and not intended to limit the invention thereto.

If a woven fabric is employed, it may be of any weave pattern, including plain weave, twill, satin, three dimensional woven fabrics, and any of their several variations. Plain weave fabrics are preferred and more preferred are plain weave fabrics having an equal warp and weft count. The woven fabric may be used with or without a resin matrix, as discussed below with respect to the non-woven fabrics.

The high strength fabric may also preferably be in the form of a non-woven fabric, such as plies of unidirectionally oriented fibers, or fibers which are felted in a random orientation, which are embedded in a suitable resin matrix. Preferably, the non-woven fabric is formed from unidirectionally oriented high tenacity fibers extended chain polyethylene fibers.

In one embodiment, the non-woven fabric is formed from a plurality of plies of individual layers of unidirectionally oriented fibers in which the fibers in one layer extend in one direction and the fibers of an adjacent layer extend in a direction at an angle to the one direction, such as 90°, from the fibers in the first layer. Where the individual plies are unidirectionally oriented fibers, the successive plies are preferably rotated relative to one another, for example at angles of 0°/90° or 0°/45°/90°/45°/0° or at other angles.

It is convenient to characterize the geometries of the non-woven fabrics useful in this invention by the geometries of the fibers. One such suitable arrangement is a fibrous layer in which the fibers are aligned parallel to one another along a common fiber direction (referred to as a "unidirectionally aligned fiber network"). Successive layers of such unidirectionally aligned fibers can be rotated with respect to the previous layer. Preferably, the fibrous layers of the composite are cross-plied, that is, with the fiber direction of the unidirectional fibers of each network layer rotated with respect to the fiber direction of the unidirectional fibers of the adjacent layers. An example is a five layer structure with the second, third, fourth and fifth layers rotated +45°, −45°, 90° and 0° with respect to the first layer. Another example is a two layer structure with a 0°/90° layup. Such rotated unidirectional alignments are described, for example, in U.S. Pat. Nos. 4,457,985; 4,748,064; 4,916,000; 4,403,012; 4,623,574; and 4,737,402.

The resin matrix for the unidirectionally oriented fiber plies may be formed from a wide variety of thermoplastic, and preferably elastomeric, materials having desired characteristics. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

Alternatively, the resin matrix may be selected to have a high tensile modulus when cured, as at least about $1\times10^6$ psi (6895 MPa). Examples of such materials are disclosed, for example, in U.S. Pat. No. 6,642,159, the disclosure of which is expressly incorporated herein by reference.

The proportion of the resin matrix material to fiber in the fabric matrix preferably forms about 1 to about 98 percent by weight, more preferably from about 5 to about 95 percent by weight, and most preferably from about 5 to about 40 percent by weight, of the total weight of the fabric matrix.

A wide variety of thermoplastic materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene.

One preferred group of materials for high tenacity polyolefin fiber fabrics, in particular high tenacity extended chain polyethylene fiber fabrics, are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R\text{-}(BA)_x$ (x=3–150); wherein A is a block from a polyvinyl aromatic monomer and B is a block from a conjugated diene elastomer. Preferably the resin matrix is a flexible thermoplastic material. A preferred resin matrix is an isoprene-styrene-isoprene block copolymer, such as Kraton® D1107 isoprene-styrene-isoprene block copolymer available from Kraton Polymer LLC.

In general, the non-woven fabric useful herein is preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. The non-woven fabric may be constructed via a variety of methods. In the preferred case of a unidirectionally aligned fabric, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The high tenacity fabrics may be coated with the chosen matrix resin by applying the matrix composition to the fibers and then consolidating the matrix composition/high tenacity fibers in a known manner. By "consolidating" is meant that the matrix material and the fiber network layer are combined into a single unitary layer. Consolidation can occur via drying, cooling, heating, pressure or a combination thereof. In the case of unidirectional non-woven fabrics, for example, one known technique is to pass the fibers from a creel and through a combing station to form a unidirectional fiber network. The fiber network is then placed on a carrier web and the matrix resin is coated thereon, such as by spraying or dipping using a roll coater or the like. The coated fiber (unitape) is then passed through an oven to evaporate the water or strip off the solvent from the composition and is wound up on a roller. The carrier web may be stripped from the fabric upon rolling or may be stripped when the fabric is used.

In the case of a woven fabric, it may be surface coated or fully impregnated with a suitable resin matrix. For example, the woven fabric may be spray coated with the resin matrix or dipped into a container containing the resin matrix, after which the water or solvent is driven off.

The fabric sleeve is preferably applied to the plastic pipe by winding the fabric in a helical manner about the outer surface of the pipe. For example, the pipe may initially be wound with the fabric in one direction, and then overlapped by winding the fabric in the opposite direction. When winding the fabric over the pipe, each successive layer may, for example, overlap the previous layer by about one-half of the width of the previous layer. When helically winding the fabric, a winding angle of from about 40 to about 60 degrees is preferred. To achieve the maximum burst strength the winding angle should be about 57 degrees.

The fabric sleeve is preferably not adhered to the outer surface of the pipe and merely overlies the outer surface so that it is free to move over the outer surface. Alternatively, the fabric sleeve may be adhered to the outer surface of the pipe by any suitable adhesive. Examples of adhesives that may be employed in this invention include thermoplastic and thermosetting adhesives, either in resin or cast film form. Such adhesives include pressure sensitive adhesives, high elongation urethanes, flexible epoxies, and the like.

One or more plastic films can be included in the fabric structure in order to improved the adhesion between the fabric and the pipe. For example, a plastic film may be employed on fabric surface which faces the outer surface of the pipe. Any suitable plastic film may be employed, such as films made of polyolefins. Examples of such films are linear low density polyethylene (LLDPE) films, ultrahigh molecular weight polyethylene (UHMWPE) films, polyester films, nylon films, polycarbonate films and the like. Preferably such films are LLDPE films. These films may be of any desirable thickness. Typical thicknesses range from about 0.1 to about 1.2 mils (2.5 to 30 μm), more preferably from about 0.2 to about 1 mil (5 to 25 μm), and most preferably from about 0.3 to about 0.5 mils (7.5 to 12.5 μm). In one embodiment, a LLDPE film is adhered to a unidirectional tape of the high tenacity extended chain polyethylene fibers which have been coated with a resin matrix.

Because they are formed from high tenacity polyolefin fibers, the fabric sleeves of this invention are lightweight strong, impact resistant, and inert to water. They greatly improve the burst strength of the plastic pipe and do not dramatically increase the weight or the cost of the structure.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percents are by weight, unless otherwise stated.

EXAMPLES

Example 1

A reinforced plastic pipe is formed by helically winding a 4 inch (10.2 cm) internal diameter HDPE pipe with a high tenacity extended chain polyethylene fabric. The fabric is a unidirectional tape formed from 650 denier Spectra® 1000 yarn having 34 ends per inch (13.4 ends per cm). The Spectra 1000® yarn is a high tenacity extended chain polyethylene yarn having a tenacity of 36 g/d and an initial tensile modulus of 1175 g/d. The unitape is formed by passing the Spectra® fibers from a creel and through a combing station to form a unidirectional network. The fiber network is then placed on a carrier web and the matrix resin is coated thereon. The resin matrix is a thermoplastic elastomer (Kraton® D1107 isoprene-styrene-isoprene block copolymer available from Kraton Polymer LLC). The coated fiber network is then passed through an oven to evaporate the solvent and is wound up on a roller, with the carrier web stripped therefrom, in preparation for forming the pipe reinforcement. The resulting unitape structure contains 30 weight percent of the elastomer resin matrix.

The unitape non-woven fabric, 8.5 inches (21.6 cm) wide is helically wound about the HDPE pipe, with succeeding layers overlapping the previous layers by about one-half of the width. No adhesive is used to bond the fabric to the HDPE pipe. The winding angle is 57 degrees and the fabric is wound first in one direction and then in the opposite direction. The fabric sleeve is movable over the pipe.

The reinforced plastic pipe is tested for burst strength and other properties. It is found that the burst strength of the reinforced pipe exceeds 2000 psi (13,780 kPA). In contrast, the unreinforced pipe has a burst strength of 200 psi (1378 kPA).

Example 2

A reinforced pipe is formed by helically winding a 4 inch (10.2 cm) internal diameter HDPE pipe with a high tenacity extended chain polyethylene fabric. The fabric is a woven fabric (available from Barrday, Inc. of Ontario, Canada) formed from 2400 denier Spectra® 900 yarn (tenacity of 30 g/d and initial tensile modulus of 850 g/d) having 30 ends per inch (11.8 ends per cm) in the warp and 650 denier polyethylene terephthalate yarn having 20 ends per inch (7.9 ends per cm) in the weft.

Strips of the woven fabric, which are 8 inches (20.3 cm), wide are helically wound about the HDPE pipe, with succeeding layers overlapping the previous layers by one-half of the width. No adhesive is used to bond the fabric to the HDPE pipe. The winding angle is 57 degrees and the fabric is wound first in one direction and then in the opposite direction. The fabric sleeve is movable over the pipe.

The reinforced plastic pipe is tested for burst strength and other properties. It is found that the burst strength of the reinforced pipe exceeds 2000 psi (13,780 kPA). In contrast, the unreinforced pipe has a burst strength of 200 psi (1378 kPA).

Example 3

Example 1 is repeated except that the unitape is formed from 4800 denier Spectra® 900 yarn, which has a tenacity of 25.5 g/d and an initial tensile modulus of 785 g/d.

Similar results are noted.

Example 4

Example 1 is repeated except that the unitape is formed from 1200 denier Spectra® 900 yarn, which has a tenacity of 30 g/d and an initial tensile modulus of 850 g/d.

Similar results are noted.

As can be seen, the reinforced plastic pipe of this invention has substantially increased burst strength compared with unreinforced pipe. The pipe also has improved impact resistance. The pipe can be used to transport natural gas under low pressure (≦200 psi (1378 kPA)) or under higher pressures. In particular, the pipe can be used to transport natural gas under pressures exceeding 200 psi (1378 kPA).

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A pipe for distribution of natural gas comprising:
   (a) a plastic pipe, said pipe having an inner surface and an outer surface, said inner surface defining a channel for conveying natural gas therethrough, and
   (b) a non-woven fabric overlying at least a portion of said outer surface of the said pipe and forming a sleeve around at least a portion of said pipe, said fabric comprising high tenacity polyolefin fibers, whereby said pipe is resistant to impact and has improved burst strength.

2. The pipe of claim 1 wherein said fibers comprise high tenacity extended chain polyethylene fibers.

3. The pipe of claim 2, further comprising a matrix resin coating said fibers of said non-woven fabric.

4. The pipe of claim 3, wherein said non-woven fabric comprises said high tenacity extended chain polyethylene fibers which are arranged unidirectionally.

5. The pipe of claim 4, wherein said fabric is helically wound about said outer surface of said pipe.

6. The pipe of claim 5, wherein said fabric is helically wound about said outer surface of said pipe at an angle of between about 40 and about 60°.

7. The pipe of claim 4 wherein at least about 50% of the fibers in said non-woven fabric comprise said high tenacity extended chain polyethylene fibers.

8. The pipe of claim 4 wherein at least about 75% of the fibers in said non-woven fabric comprise said high tenacity extended chain polyethylene fibers.

9. The pipe of claim 2 wherein said fabric forms a sleeve over said outer surface of said pipe and is not bonded thereto such that said sleeve is movable over said outer surface.

10. The pipe of claim 2 further comprising an adhesive layer between said fabric and said outer surface of said pipe, said adhesive layer bonding said fabric to said outer layer.

11. The pipe of claim 3 wherein said matrix resin comprises a thermoplastic elastomeric material.

12. The pipe of claim 11 wherein said matrix resin comprises an isoprene-styrene-isoprene block copolymer.

13. The pipe of claim 11 wherein said matrix resin comprises from about 5 to about 40 weight percent based on the total weight of said fabric and said resin.

14. The pipe of claim 2 wherein said plastic pipe comprises high density polyethylene.

15. The pipe of claim 1 wherein said fibers have a tenacity of at least about 30 g/d.

16. A pipe for distribution of natural gas comprising:
    (a) a plastic pipe, said pipe having an inner surface and an outer surface, said inner surface defining a channel for conveying natural gas therethrough, and
    (b) a woven fabric overlying at least a portion of said outer surface of the said pipe and forming a sleeve around at least a portion of said pipe, said fabric comprising high tenacity polyethylene fibers, whereby said pipe is resistant to impact and has improved burst strength, wherein said woven fabric comprises high tenacity extended chain polyethylene fibers extending in a first direction and another thermoplastic fiber extending in a second direction.

17. The pipe of claim 16 wherein said another thermoplastic fiber comprises polyester fibers.

18. The pipe of claim 16, further comprising a matrix resin coating said fibers of said woven fabric.

19. The pipe of claim 18 wherein said matrix resin comprises a thermoplastic elastomeric material.

20. The pipe of claim 19 wherein said resin comprises an isoprene-styrene-isoprene block copolymer.

21. A pipe for distribution of natural gas comprising:
    (a) a plastic pipe, said pipe having an inner surface and an outer surface, said inner surface defining a channel for conveying natural gas therethrough, and
    (b) a woven fabric overlying at least a portion of said outer surface of the said pipe and forming a sleeve around at least a portion of said pipe, said fabric comprising high tenacity extended chain polyethylene fibers, whereby said pipe is resistant to impact and has improved burst strength, wherein said fabric is helically wound about said outer surface of said pipe.

22. The pipe of claim 21 wherein said fabric is helically wound about said outer surface of said pipe at an angle of between about 40 and about 60°.

23. The pipe of claim 21 wherein at least about 50% of the fibers in said fabric comprise said high tenacity extended chain polyethylene fibers.

24. The pipe of claim 21 wherein said woven fabric forms a sleeve over said outer surface of said pipe and is not bonded thereto such that said sleeve is movable over said outer surface.

25. A pipe for distribution of natural gas comprising:
    (a) a plastic pipe, said pipe having an inner surface and an outer surface, said inner surface defining a channel for conveying natural gas therethrough, and
    (b) a woven fabric overlying at least a portion of said outer surface of the said pipe and forming a sleeve around at least a portion of said pipe, said fabric comprising high tenacity extended chain polyethylene fibers, whereby said pipe is resistant to impact and has improved burst strength, said pipe further comprising an adhesive layer between said woven fabric and said outer surface of said pipe, said adhesive layer bonding said woven fabric to said outer layer.

26. The pipe of claim 21 wherein said plastic pipe comprises high density polyethylene.

27. The pipe of claim 1 further comprising a plastic film overlying said fabric.

28. A pipe for distribution of natural gas comprising:
    (a) a plastic pipe, said pipe having an inner surface and an outer surface, said inner surface defining a channel for conveying natural gas therethrough, and
    (b) a non-woven fabric overlying at least a portion of said outer surface of said pipe in a helical manner and forming a sleeve around at least a portion of said pipe, said sleeve not being bonded to said outer surface such that said sleeve is movable over said outer surface of said pipe, said fabric comprising high tenacity polyolefin fibers which are arranged unidirectionally, whereby the pipe is resistant to impact and has improved burst strength.

29. The pipe of claim 28 wherein said high tenacity polyolefin fibers comprise extended chain polyethylene fibers.

30. The pipe of claim 29 further comprising a matrix resin coating said fibers of said non-woven fabric.

31. The pipe of claim 30 wherein said matrix resin comprises a thermoplastic elastomeric material.

32. The pipe of claim 21 wherein said high tenacity extended chain polyethylene fibers extend in one direction of said woven fabric and other thermoplastic fibers extend in another direction of said woven fabric.

33. The pipe of claim 21 comprising a matrix resin coating said fibers of said woven fabric.

34. The pipe of claim 21 wherein said sleeve is not bonded to said outer surface of said pipe such that said sleeve is movable over said outer surface.

35. A method of transporting natural gas through a pipe, said method comprising utilizing as said pipe a structure which comprises:
   (a) a plastic pipe formed from high density polyethylene, said inner surface defining a channel for conveying natural gas therethrough, and
   (b) a non-woven fabric overlying at least a portion of said outer surface of said pipe and forming a sleeve around at least a portion of said pipe, said fabric comprising high tenacity extended chain polyethylene fibers.

36. The method of claim 35 wherein said natural gas is transported at a pressure exceeding 200 psi (1378 kPA).

* * * * *

UNITED STATES PATENT AND TRADEMARK OFFICE
CERTIFICATE OF CORRECTION

PATENT NO. : 7,600,537 B2  Page 1 of 1
APPLICATION NO. : 11/228935
DATED : October 13, 2009
INVENTOR(S) : Bhatnagar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Fifth Day of October, 2010

David J. Kappos
*Director of the United States Patent and Trademark Office*